United States Patent [19]
Jain

[11] Patent Number: 5,828,482
[45] Date of Patent: Oct. 27, 1998

[54] APPARATUS AND METHOD FOR DIRECTING A BEAM OF LIGHT TO A SURFACE OF AN OPTICAL DISK

[75] Inventor: Amit Jain, Sunnyvale, Calif.

[73] Assignee: TeraStor Corporation, San Jose, Calif.

[21] Appl. No.: 795,606

[22] Filed: Feb. 5, 1997

[51] Int. Cl.$^6$ ............................................ G02B 26/08
[52] U.S. Cl. ...................... 359/211; 359/837; 369/112
[58] Field of Search ..................... 359/209–211, 831, 359/837; 369/112, 119, 120, 44.23

[56] References Cited

U.S. PATENT DOCUMENTS

| | | | |
|---|---|---|---|
| 4,515,447 | 5/1985 | Weimer et al. | 359/837 |
| 4,633,450 | 12/1986 | Gueugnon | 369/13 |
| 4,753,521 | 6/1988 | Deserno | 359/663 |
| 4,794,586 | 12/1988 | Korth | 369/215 |
| 4,965,780 | 10/1990 | Lee et al. | 369/13 |
| 4,987,292 | 1/1991 | Howard | 250/201.5 |
| 5,004,307 | 4/1991 | Kino et al. . | |
| 5,020,040 | 5/1991 | Lee | 369/13 |
| 5,105,408 | 4/1992 | Lee et al. | 369/44.15 |
| 5,112,662 | 5/1992 | Ng | 428/64 |
| 5,115,363 | 5/1992 | Khan et al. | 360/104 |
| 5,120,603 | 6/1992 | Schmidt | 428/336 |
| 5,121,256 | 6/1992 | Corle | 359/356 |
| 5,125,750 | 6/1992 | Corle et al. | 359/819 |
| 5,128,216 | 7/1992 | Ng | 428/695 |
| 5,153,870 | 10/1992 | Lee et al. | 369/111 |
| 5,161,134 | 11/1992 | Lee | 369/13 |
| 5,182,444 | 1/1993 | Howard | 250/201.5 |
| 5,191,563 | 3/1993 | Lee et al. | 369/13 |
| 5,197,050 | 3/1993 | Murakami et al. | 369/13 |
| 5,202,880 | 4/1993 | Lee et al. | 369/275.4 |
| 5,223,710 | 6/1993 | Pavlak | 250/230 |
| 5,232,570 | 8/1993 | Haines et al. | 204/192.16 |
| 5,243,241 | 9/1993 | Wang | 310/36 |
| 5,247,510 | 9/1993 | Lee et al. | 369/118 |
| 5,253,245 | 10/1993 | Rabedeau | 369/119 |
| 5,255,260 | 10/1993 | Yamada et al. | 369/199 |
| 5,260,928 | 11/1993 | Lee et al. | 369/112 |
| 5,288,997 | 2/1994 | Betzig et al. | 359/356 |
| 5,295,122 | 3/1994 | Murakami et al. | 369/13 |
| 5,307,336 | 4/1994 | Lee et al. | 369/112 |
| 5,381,402 | 1/1995 | Lee et al. | 369/291 |
| 5,432,763 | 7/1995 | Campbell et al. | 369/44 |
| 5,445,011 | 8/1995 | Ghislain et al. | 250/306 |
| 5,450,379 | 9/1995 | Fujimori et al. | 369/275.1 |
| 5,452,283 | 9/1995 | Lee et al. | 369/112 |
| 5,467,238 | 11/1995 | Lee et al. | 360/128 |
| 5,470,627 | 11/1995 | Lee et al. | 428/64.4 |
| 5,486,970 | 1/1996 | Lee et al. | 360/128 |
| 5,497,359 | 3/1996 | Mamin et al. | 369/44.15 |
| 5,504,731 | 4/1996 | Lee et al. . | |
| 5,541,888 | 7/1996 | Russell | 369/112 |
| 5,602,819 | 2/1997 | Inagaki et al. | 369/112 |
| 5,602,820 | 2/1997 | Wickramasinghe et al. | 369/126 |
| 5,617,387 | 4/1997 | Morita et al. | 369/44.23 |
| 5,631,893 | 5/1997 | Kang et al. | 369/44.15 |

FOREIGN PATENT DOCUMENTS 1-61308 of 0000 Japan .

OTHER PUBLICATIONS

Betzig, E., et al., "Near–field magneto–optics and high density data storage", *Appl. Phys. Lett.*, vol. 61, No. 2, pp. 142–144, Jul. 13, 1992.

(List continued on next page.)

*Primary Examiner*—James Phan
*Attorney, Agent, or Firm*—Fish & Richardson P.C.

[57] ABSTRACT

An apparatus is used with an optical disk drive for directing a beam of light to a surface of an optical disk. The apparatus has a beam shifter configured to direct the beam from a first path (along which the beam is generated) to a second path which is substantially parallel to the first path. An imaging lens is configured to direct the beam from the second path along a third path which passes near the front focal point of an objective lens (located near the surface of the disk). The third path and the first path diverge at an angle based on the distance separating the first and second paths.

16 Claims, 6 Drawing Sheets

OTHER PUBLICATIONS

Maeda, F., et al., "High density optical disk system using a new two–element lens and a thin substrate disk", *Technical Digest, 1996 International Symposium on Optical Memory and Optical Data Storage,* pp. 342–344, 1996. (no month).

Mansfield, S., et al., "High–numerical–aperture lens system for optical storage", *Optics Letters,* vol. 18, No. 4, pp. 305–307, Feb. 15, 1993.

Mansfield, S., et al., "Solid immersion microscope", *Appl. Phys. Lett.,* vol. 57, No. 24, pp. 2615–2616, Dec. 10, 1990.

Yamamoto, K., et al., "A 0.8 Numerical Aperture Two Element Objective Lens for the Optical Disk", *Technical Digest, 1996 International Symposium on Optical Memory and Optical Data Storage,* pp. 345–347, 1996. (no month).

Hayashi, S., et al., "Solid Immersion Lens for Optical Storage," Stanford University, G.L. Report No. 5258, Feb. 1995 (9 page document).

Ichimura, Isao, et al., "High Density Optical Recording Using a Solid Immersion Lens," Stanford University, G.L. Report No. 5371, Nov. 1995, pp. 1–22 and Figs. 1–17.

Mamin, H.J., et al., "High density optical recording with a flying solid immersion lens," presented at the Optical Data Storage Conference in San Diego, California in May, 1995, pp. 1–2.

Terris, B.D., et al. "Near–field optical data storage using a solid immersion lens," Applied Physics Letters, 65 (4), Jul. 25, 1994, pp. 388–390.

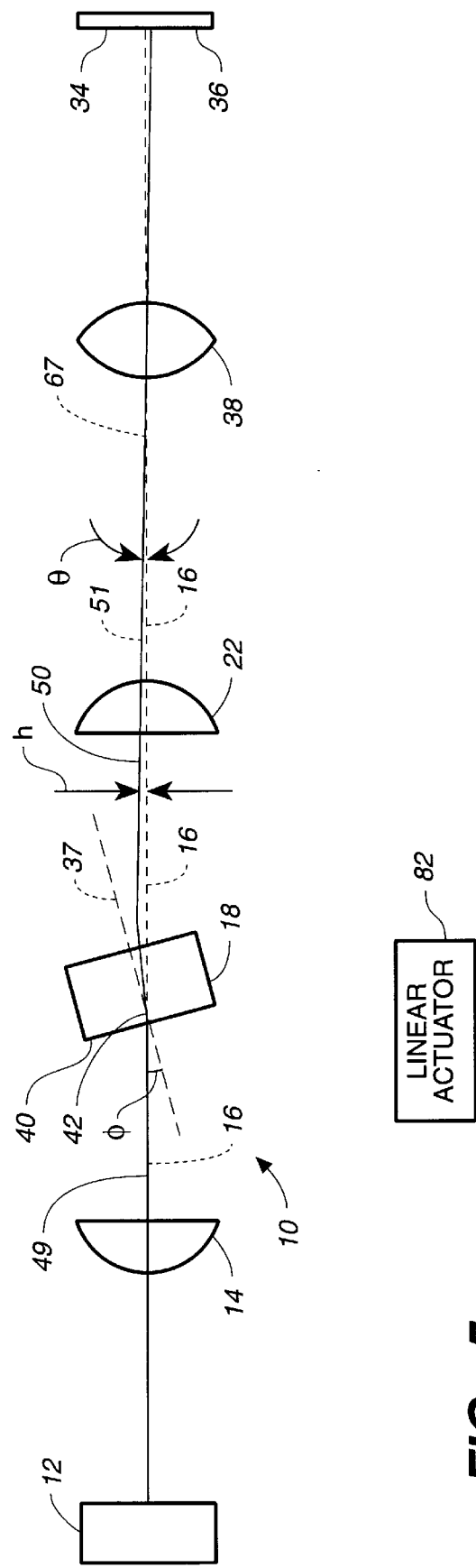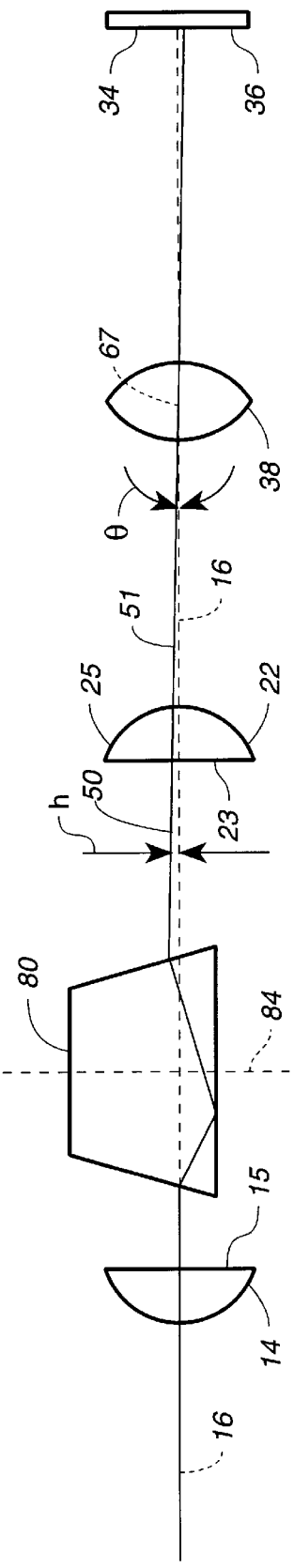

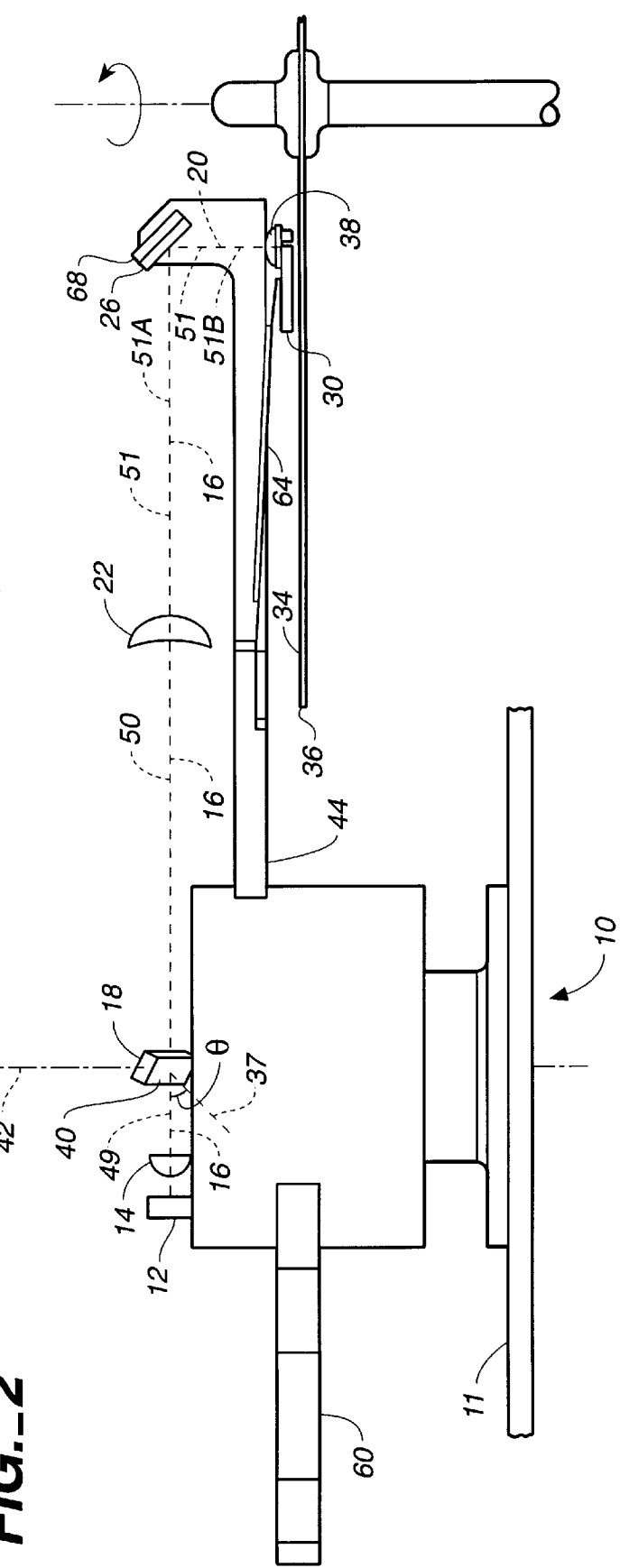
FIG._2

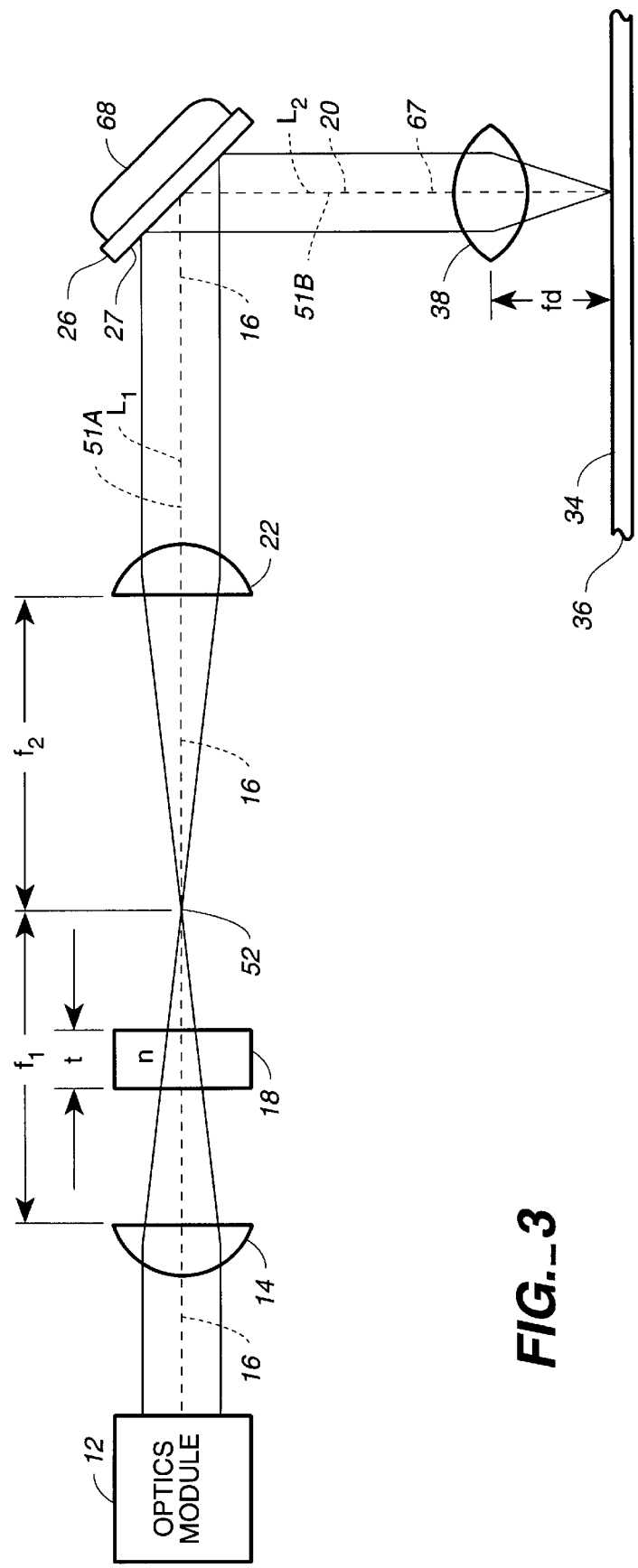
FIG._3

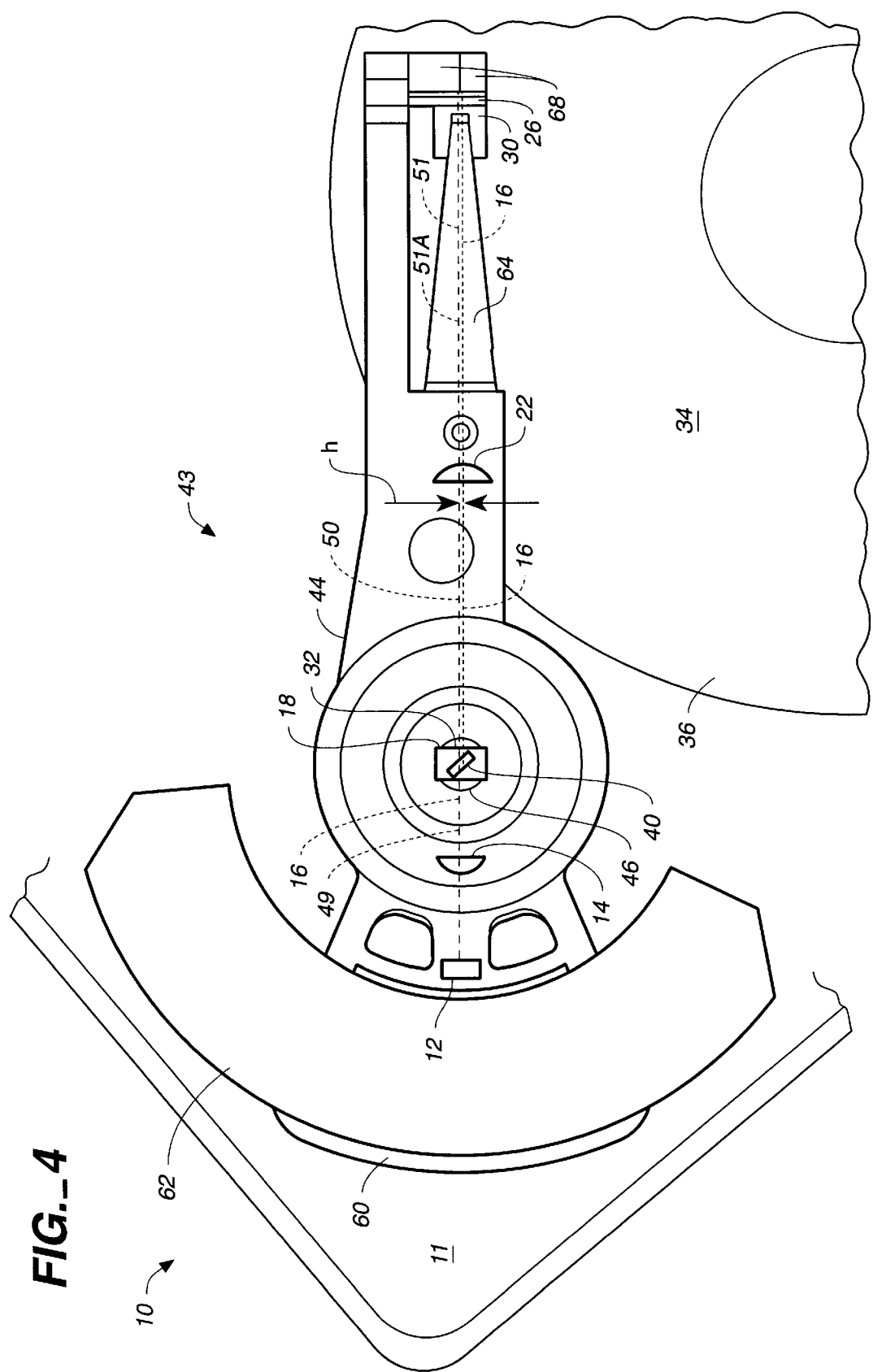
FIG._4

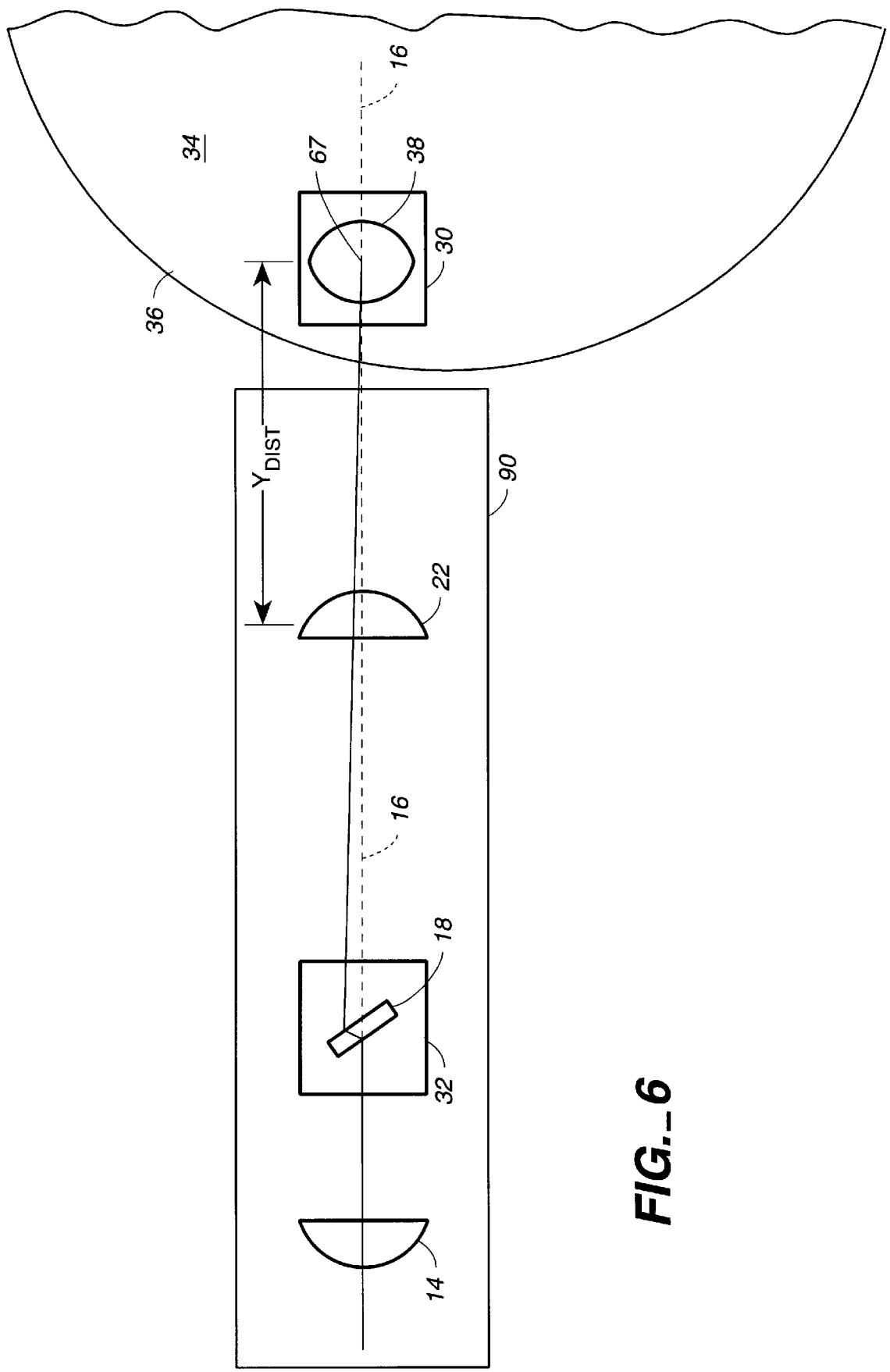

FIG._7
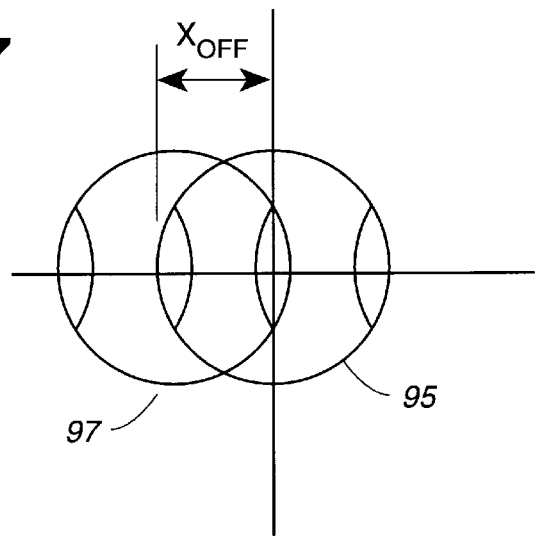
FIG._8
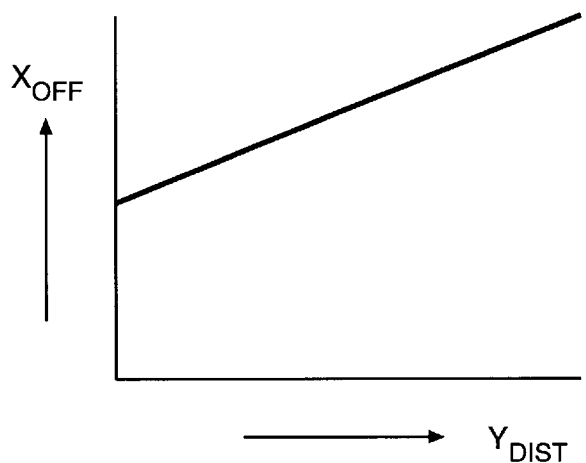
FIG._9
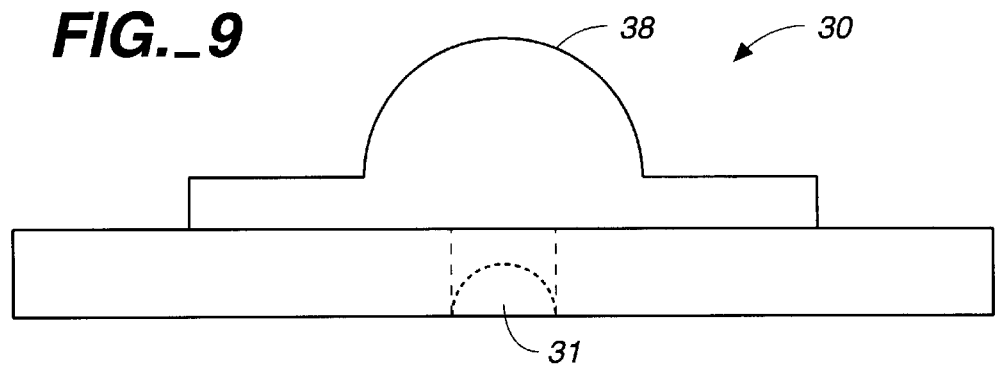

APPARATUS AND METHOD FOR DIRECTING A BEAM OF LIGHT TO A SURFACE OF AN OPTICAL DISK

BACKGROUND OF THE INVENTION

The invention relates to directing a beam to a surface of an optical disk.

Optical mass storage provides a convenient mechanism for storing large amounts of data. For a typical optical disk, stored data is arranged in tracks present on a reflective surface of the disk. For purposes of reading the data from a selected track, a typical optical disk drive has optics which generate a beam of light (e.g., a laser beam) and direct the beam toward the selected track where the beam is reflected. The data stored on the disk is reconstructed by monitoring the beam after reflection. The optics may include a moveable mirror or lens to precisely guide the beam to the selected track. An objective lens is typically located near the reflective surface to focus the beam upon the surface.

An object of the invention is to provide coarse and fine positioning of a beam upon a reflective surface of an optical disk using a transparent plate or a prism. Another object of the invention is to always pass the beam near a front focal point of an objective lens (used to focus the beam upon the reflective surface). Another object of the present invention is to minimize the effect of assembly tolerances on beam positioning.

Additional objects and advantages of the invention will be set forth in the description that follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

In general, in one aspect, the invention features an apparatus for use with an optical disk drive for directing a beam of light to a surface of an optical disk. The apparatus has a beam shifter configured to direct the beam from a first path (along which the beam is generated) to a second path which is substantially parallel to the first path. An imaging lens is configured to direct the beam from the second path along a third path which passes near the front focal point of an objective lens (located near the surface of the disk). The third path and the first path diverge at an angle based on the distance separating the first and second paths.

Implementations of the invention may include one or more of the following. The objective lens and the surface of the disk may be separated by approximately the rear focal length of the objective lens. The imaging lens and the objective lens may be separated by approximately the focal length of the imaging lens. The beam is reflected from the surface of the disk and passes through the imaging lens after being reflected by the surface of the disk. The apparatus may have a detector connected to decode data from the beam after the beam is reflected from the surface of the disk and another lens located between the imaging lens and the detector. This additional lens may be configured to at least partially collimate the beam after the beam passes through the imaging lens, and the additional lens and the imaging lens may be separated by approximately the sum of the focal lengths of the two lenses. The disk drive may include a rotary actuator on which the apparatus is mounted. The disk drive may include a linear actuator on which the apparatus is mounted.

The beam shifter may include a transparent plate that is adapted to rotate about a shaft. The distance between the first and second paths varies with the angular displacement of the transparent plate with respect to a predetermined reference point on the shaft. The beam shifter may have a dove prism that is adapted to slide along a shaft. The distance between the first and second paths varies with the displacement of the dove prism with respect to a predetermined reference point on the shaft.

The apparatus may have a mirror configured to direct the beam from the imaging lens toward the objective lens. The mirror may have a surface that is partially transmissive and partially reflective, and the apparatus may include a detector mounted to the mirror for providing an indication of the position of the beam on the surface of the mirror based on light from the beam transmitted through the surface of the mirror.

In general, in another aspect, the invention features an apparatus for use with an optical disk drive for directing the movement of a beam of light to a surface of an optical disk. The apparatus has a rotary actuator arm and a source mounted to the actuator arm that is configured to generate a beam of light along a first path. A beam shifter is mounted to the actuator arm and configured to direct the beam from the first path along a second path substantially parallel to the first path. An imaging lens is mounted to the actuator arm and configured to direct the beam from the second path along a third path which passes near the front focal point of an objective lens (mounted to the actuator arm and located near the surface of the disk). The third path and the first path diverge at an angle based on the distance separating the first and second paths. The apparatus also has a relay lens that is mounted to the actuator arm and configured to collimate the beam along the first path.

In general, in another aspect, the invention features a method for use with an objective lens of an optical disk drive for directing the movement of a beam of light to a surface of an optical disk. The method includes generating a beam of light along a first path. The beam from the source is directed along a second path that is substantially parallel to the first path. The beam from the second path is directed along a third path which passes near the front focal point of an objective lens (located near the surface of the disk). The third and first paths diverge at an angle based on the distance separating the first and second paths.

BRIEF DESCRIPTION OF THE DRAWINGS

The accompanying drawings, which are incorporated in and constitute a part of the specification, schematically illustrate the invention, and together with the general description given above and the detailed description below, serve to explain principles of the invention.

FIG. 1 is a schematic diagram illustrating optics of an optical disk drive.

FIG. 2 is a side view of a rotary actuator of the optical disk drive.

FIG. 3 is a side view of the optics mounted to the rotary actuator.

FIG. 4 is a top view of the rotary actuator.

FIG. 5 is a schematic diagram illustrating optics of an optical disk drive.

FIG. 6 is a top view of a linear actuator of an optical disk drive.

FIG. 7 is an illustration of an offset introduced by the linear actuator of FIG. 6.

FIG. 8 is a graph illustrating the offset introduced by the linear actuator of FIG. 6.

FIG. 9 is a detailed side view of the slider of FIG. 2.

DESCRIPTION OF THE PREFERRED EMBODIMENTS

As shown in FIG. 1, in an optical disk drive 10, an objective lens 38 is used to focus a beam of light (e.g., a laser beam) upon a reflective data surface 34 of an optical disk 36. The surface 34 may either be the top surface of the disk 36 or a lower, substrate surface of the disk 36. To govern where the beam appears on the surface 34 (i.e., to guide the beam to a selected track), the optical disk drive 10 has a pivotally mounted transparent plate 18 used to control an angle of incidence θ at which the beam passes through (or in the vicinity of) a front focal point 67 of the objective lens 38. The angle of incidence θ is measured between an optical axis 16 (coaxial with the objective lens 38) and the beam. Regardless of the angle θ, the beam is always directed near the front focal point 67 of the objective lens 38 due to an imaging lens 22 located between the transparent plate 18 and the objective lens 38.

The beam is generated by an optics module 12 which projects the beam along an optical path 49 that substantially follows the optical axis 16. The optical axis 16 is substantially parallel to the surface 34 (FIG. 2), and the axis 16 passes through the transparent plate 18.

The angular position of the plate 18 controls an angle of incidence φ measured between the normal 37 to a surface 40 of the plate 18 and the optical axis 16. As shown in FIG. 2, the plate 18 pivots about a vertical axis 42 substantially normal to the surface 34. When the angle of incidence φ is near zero, the beam passes directly through the transparent plate 18 which sets the angle of incidence θ approximately equal to zero. When the angle of incidence φ is non-zero, the transparent plate 18 shifts the beam such that the beam exits the transparent plate 18 following an optical path 50 (FIG. 1) substantially parallel to and spaced a distance h from the optical axis 16.

The imaging lens 22 converts the distance h into an equivalent angle of incidence θ. Being coaxially aligned with the optical axis 16, the imaging lens 22 takes the beam received from the optical path 50 and directs the beam along an optical path 51 to form the angle of incidence θ. When the distance h is approximately zero, the angle of incidence θ and the angle of incidence φ are both approximately equal to zero.

Once the beam reaches and is incident upon the surface 34, the beam is reflected and follows generally along optical paths 51, 50, and 49 back to the optics module 12. The optics module 12 has data and servo detectors to decode the information provided by the reflected beam.

As shown in FIG. 3, to insure that a collimated beam generated by the optics module 12 remains collimated before entering the objective lens 38, the disk drive 10 has a relay lens 14 coaxially aligned with the optical axis 16. As described below, the transparent plate 18 modifies a rear focal length f1 of the lens 14 to create an effective rear focal length f1' which places the rear focal point of the lens 14 at a point 52 along the optical axis 16. The imaging lens 22 has a front focal point in the vicinity of the point 52.

The transparent plate 18 is positioned between the two lenses 14 and 22. As shown, the transparent plate 18 is positioned along the optical axis 16 between the lens 14 and the point 52; however, the transparent plate 18 may alternatively be positioned along the optical axis 16 between the point 52 and the imaging lens 22.

The effective focal length f1' of the relay lens 14 takes into account a refractive index n of the transparent plate 18. For a plate 18 thickness t, the actual focal length f1 of the relay lens 14 is increased by $t*(1-1/n)$ to form the focal length f1'.

The imaging lens 22 collimates the beam from the optics module 12 and directs the beam along an optical path 51a toward a rigidly secured mirror 26 located above the objective lens 38. A partially reflective (and partially transmissive) surface 27 of the mirror 26 directs the beam along an optical path 51b toward the front focal point 67 of the objective lens 38. The combined optical paths 51a and 51b form the optical path 51. The objective lens 38 focuses the beam on the surface 34 and receives the beam after reflection from the surface 34. The rear focal point of the objective lens 38 (located a focal length f4 from the objective lens 38) is in the vicinity of the surface 34. The optical axis 20 is normal to the surface 34 and is linked to the optical axis 16 via the mirror 26. For purposes of properly focusing the beam upon the surface 34 and guiding the beam through the front focal point 67 of the objective lens 38 for all values of the angle θ, the objective lens 38 is separated from the imaging lens 22 by about the rear focal length f3 of the imaging lens 22.

The focal lengths f1 and f2 may be varied to demagnify (or magnify) the size of the beam appearing at the objective lens 38 and thus, reduce (or increase) the required size of the objective lens 38. For purposes of correcting for assembly tolerances, the relay lens 14 and the imaging lens 22 may be spaced apart slightly more than the sum of the two focal lengths f1 and f2.

A preferred range for the thickness t of the transparent plate 18 is from 2–6 mm. A preferred range of the focal length f2 of the imaging lens 22 is from 6–20 mm. The angle of incidence φ has a preferred range of 2–5 degrees. The angle of incidence θ may be approximated as being linearly dependent on the angle of incidence φ by the following equation:

$$\theta = \left(\frac{t}{f2}\right) \cdot (\phi) \cdot \left(\frac{1 - \frac{1}{n}}{1 - \frac{1}{2}\left(\frac{\phi}{n}\right)^2}\right)$$

The precise relationship of the angle of incidence θ to the angle of incidence φ is given by the following equation:

$$\theta = \tan^{-1}\left[\frac{t}{f2} \sin\phi \left[1 - \sqrt{\frac{1 - \sin^2\phi}{n^2 - \sin^2\phi}}\right]\right]$$

As shown in FIG. 4, for purposes of coarsely positioning the beam on the surface 34, the disk drive 10 has a rotary actuator 43 which includes a rotary actuator arm 44 substantially parallel to the surface 34 and pivotally mounted to a drive base plate 11 of the disk drive 10. For purposes of controlling movement of the arm 44, the rotary actuator 43 has a coil 60 positioned to interact with a permanent magnet 62 fixed to the drive base plate 11. The relay lens 14, imaging lens 22, and mirror 26 are all secured to the arm 44. The objective lens 38 is part of a slider 30 secured to the arm 44 and positioned to float over the surface 34 via a flexure 64. As shown in FIG. 9, the slider 30 has a solid immersion lens (SIL) 31 located between the objective lens 38 and the surface 34.

The position of the plate 18 is controlled by a galvanometer 32 secured to the arm 44. The galvanometer 32 has a galvanometer motor 46 which pivotally positions the transparent plate 18 about the axis 42. As shown, the optical axis 16 is aligned with a longitudinal axis of the rotary arm 44; however, alignment with the longitudinal axis is not required.

For purposes of detecting the actual position of the beam upon the surface 34, a bi-cell detector 68 is mounted on the back of the mirror 26 behind the surface 27 (which is partially transmissive). A galvanometer-servo control loop (not shown) of the disk drive 10 receives an indication of the position of the beam upon the surface 34 from the bi-cell detector 68 and interacts with the galvanometer motor 46 to finely position the beam by pivoting the transparent plate 18.

In one embodiment, the mirror 26 may be part of a micro-galvanometer assembly (e.g., a Digital Micromirror Device (DMD) made by Texas Instruments of Fort Worth, Tex.). The mirror 26 in this embodiment is used to provide additional adjustment to the beam.

Shifting of the beam (to form the distance h) may be accomplished by devices other than the transparent plate 18. For example, as shown in FIG. 5, in an alternative embodiment, a dove prism 80 replaces the transparent plate 18 and a linear actuator 82 replaces the galvanometer motor 46. The linear actuator 82 positions the dove prism 80 along a translational axis 84 which is perpendicular to the optical axis 16 and parallel to the surface 34. The dove prism 80 is oriented such that movement of the dove prism 80 along the translational axis 84 varies the distance h and thus, the angle of incidence $\theta$.

As shown in FIGS. 6–8, in another embodiment, a linear actuator 90 replaces the rotary actuator 43. In this embodiment, a distance $Y_{DIST}$ adjustable by the linear actuator 90 between the objective lens 38 and the imaging lens 22 is not fixed, as the linear actuator 90 coarsely positions the objective lens 38 over the surface 34 by moving the slider 30 along the optical axis 16. An offset $X_{OFF}$ between an ideal lobe 95 and an actual lobe 97 observed by the optics module 12 varies linearly with the position of the slider 30 on the disk surface 34 and linearly with the angle/position of the transparent plate 18, if left uncompensated. By knowing the disk radius where the slider 30 is positioned and the position of the galvanometer 32 (e.g., the angle $\theta$ as provided by a bi-cell detector), a tracking servo control loop may compensate for the offset $X_{OFF}$ for all disk radii and beam angles (i.e., for all values of the angle $\theta$).

The present invention has been described in terms of a preferred embodiment. The invention, however, is not limited to the embodiment depicted and described. Rather, the scope of the invention is defined by the appended claims.

What is claimed is:

1. An apparatus for use with an optical disk drive for directing a beam of light to a surface of an optical disk, the beam being generated along a first path, the apparatus comprising:

a beam shifter configured to direct the beam from the first path along a second path substantially parallel to the first path, the first and second paths separated by a distance;

an objective lens near the surface of the disk, the objective lens having a front focal point; and an imaging lens configured to direct the beam from the second path along a third path which passes near the front focal point of the objective lens, wherein the third path and the first path diverge at an angle based on the distance separating the first and second paths.

2. The apparatus of claim 1, wherein the objective lens has a rear focal length, and wherein the objective lens and the surface of the disk are separated by approximately the rear focal length.

3. The apparatus of claim 1, wherein the imaging lens has a focal length, and wherein the imaging lens and the objective lens are separated by approximately the focal length of the imaging lens.

4. The apparatus of claim 1 wherein the beam is reflected from the surface of the disk and passes through the imaging lens after being reflected by the surface of the disk, the apparatus further comprising:

a detector connected to decode data from the beam after the beam is reflected from the surface of the disk; and another lens located between the imaging lens and the detector, said another lens configured to at least partially collimate the beam after the beam passes through the imaging lens.

5. The apparatus of claim 4, wherein said another lens and the imaging lens each have a focal length, and wherein said another lens and the imaging lens are separated by approximately the sum of the focal lengths.

6. The apparatus of claim 1, wherein the disk drive includes a rotary actuator, and wherein the apparatus is mounted on the rotary actuator.

7. The apparatus of claim 1, wherein the beam shifter comprises a transparent plate.

8. The apparatus of claim 7, wherein the transparent plate is adapted to rotate about a shaft, and wherein the distance between the first and second paths varies with the angular displacement of the transparent plate with respect to a predetermined reference point on the shaft.

9. The apparatus of claim 1, wherein the beam shifter comprises a dove prism.

10. The apparatus of claim 9, wherein the dove prism is adapted to slide along a shaft, and wherein the distance between the first and second paths varies with the displacement of the dove prism with respect to a predetermined reference point on the shaft.

11. The apparatus of claim 1 further comprising a mirror configured to direct the beam from the imaging lens toward the objective lens.

12. The apparatus of claim 11, wherein the mirror has a surface that is partially transmissive and partially reflective, the apparatus further comprising:

a detector mounted to the mirror for providing an indication of the position of the beam on the surface of the mirror based on light from the beam transmitted through the surface of the mirror.

13. The apparatus of claim 1, wherein the disk drive includes a linear actuator, and wherein the apparatus is mounted on the linear actuator.

14. An apparatus for use with an optical disk drive for directing the movement of a beam of light to a surface of an optical disk, the apparatus comprising:

a rotary actuator arm;

a source mounted to the actuator arm configured to generate a beam of light along a first path;

a beam shifter mounted to the actuator arm configured to direct the beam from the first path along a second path substantially parallel to the first path, the first and second paths separated by a distance;

an objective lens mounted to the actuator arm and located near the surface of the disk, the objective lens having a front focal point;

an imaging lens mounted to the actuator arm configured to direct the beam from the second path along a third path which passes near the front focal point of the objective lens, wherein the third path and the first path diverge at an angle based on the distance separating the first and second paths; and a relay lens mounted to the actuator arm configured to collimate the beam along the first path.

15. The apparatus of claim 14 wherein the distance separating the first and second paths is the perpendicular distance between the first and second paths.

16. A method for use with an objective lens of an optical disk drive for directing the movement of a beam of light to a surface of an optical disk, the objective lens having a front focal point, the method comprising:

generating a beam of light along a first path;

directing the beam from the source along a second path substantially parallel to the first path, the first and second paths being separable by a distance; and directing the beam from the second path along a third path which passes near the front focal point of the objective lens located near the surface of the disk, wherein the third path and the first path diverge at an angle based on the distance separating the first and second paths.

* * * * *